F. I. JOHNSON.
RESILIENT WHEEL TIRE.
APPLICATION FILED MAR. 17, 1915. RENEWED MAR. 25, 1918.
1,282,427.
Patented Oct. 22, 1918.
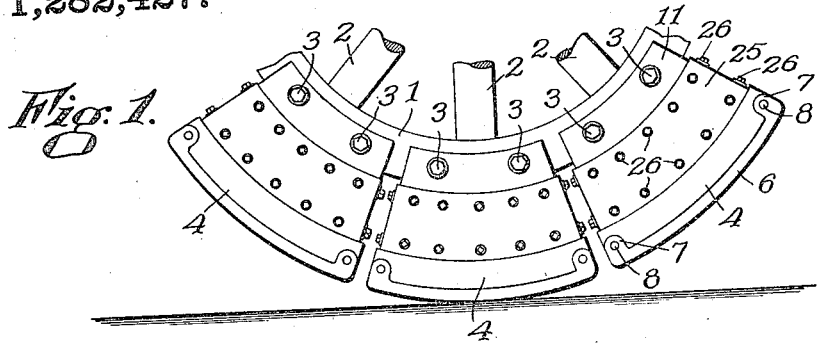
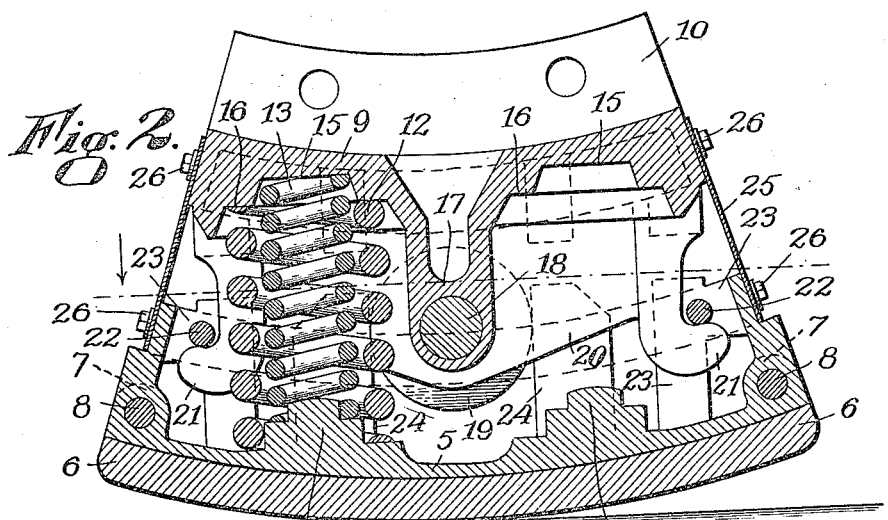
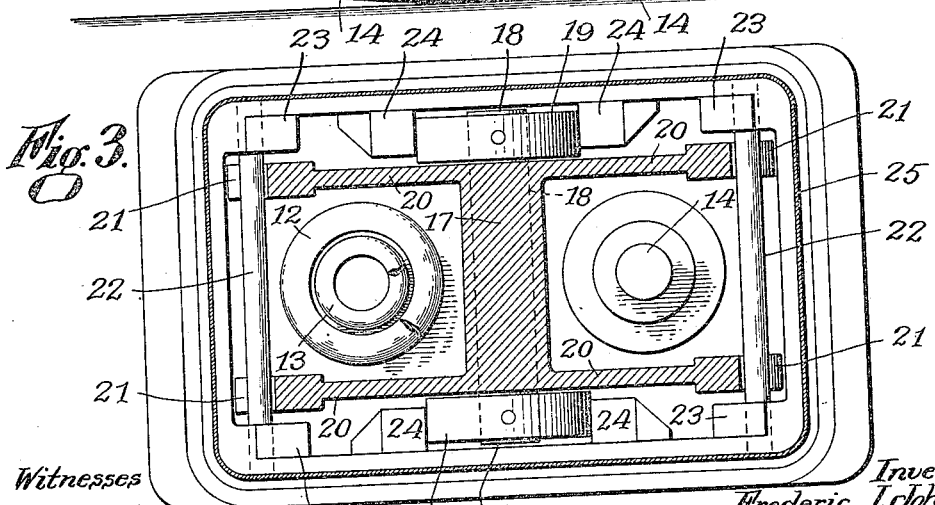
Witnesses
R. D. Tolman.
Penelope Cumberbach.
Inventor
Frederic I. Johnson.
By Fowler & Kennedy
Attorneys.

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

RESILIENT WHEEL-TIRE.

1,282,427.   Specification of Letters Patent.   Patented Oct. 22, 1918.

Application filed March 17, 1915, Serial No. 15,050. Renewed March 25, 1918. Serial No. 224,653.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Resilient Wheel-Tires, of which the following, together with the accompanying drawings, is a specification.

The object of my present invention is to provide a resilient wheel-tire substantially made of metal in which the resiliency of the tire is secured by the use of metal springs, thereby avoiding the use of flexible pneumatic tires, which are expensive and liable to become punctured. I accomplish this object by the construction and arrangement of parts as hereinafter described, the novel features being pointed out in the appended claims.

Referring to the accompanying drawings,

Figure 1 represents a portion of a wheel having my improved tire applied thereto.

Fig. 2 is a central longitudinal sectional view of one of the resilient sections forming my improved tire, and Fig. 3 is a transverse sectional view on the plane of the broken line 3—3, Fig. 2.

Similar reference characters refer to similar parts in the different figures.

My improved tire consists of a plurality of sections mounted upon the rigid rim of the wheel, said sections being spaced apart to permit the requisite freedom of movement as the sections are successively compressed beneath the weight of the load.

In the accompanying drawings 1 denotes a portion of a wheel rim mounted upon spokes 2 in the usual manner. Carried upon the periphery of the rim 1, and in the present instance attached thereto by bolts 3, are a series of resilient tire sections 4; said sections being duplicates of each other, I have illustrated one section only by sectional views in Figs. 2 and 3. Each section of my improved wheel-tire comprises a tread plate 5, to the outer side of which I preferably attach a shoe 6, having at its ends lugs 7 which overlap the sides of the tread plate 5 and are attached thereto by pins 8. Mounted upon the rigid rim 1 of the wheel is a rim plate 9, having flanges 10 and 11 to receive the bolts 3 which pass through the rim of the wheel.

Between the rim plate 9 and the tread plate 5 I interpose coil springs, arranged in pairs on each side of the center of the tire section, one pair only being shown in Figs. 2 and 3, the other pair having been removed from said Figs. 2 and 3 in order to disclose more clearly the construction of the tire sections. Each pair of springs consists of an outer spring 12 and an inner spring 13 held concentrically within the outer spring 12. Said springs 12 and 13 are maintained in position by a boss 14 on the tread plate 5 and in recessed seats 15, 16 on the rim plate 9.

The rim plate 9 has a depending lug 17 at its center through which I pass a rotatable spindle 18, to the opposite ends of which I attach rolls 19, 19. Extending upon either side of the central lug 17 are webs 20, extending toward the ends of the tire section and provided at their outer extremities with hooks 21 extending beneath and engaging rods 22 having their ends supported in lugs 23 integral with the tread plate 5. The engagement of the hooks 21 with the rods 22 limits the outward movement of the tread plate 5 as it is forced radially outward by the expansion of the coil springs 12 and 13. Erected upon the tread plate 5 are lugs 24 having their opposing inner walls vertical and contacting with the periphery of the rolls 19, 19.

As the weight of the load is brought upon the tread plate 5 to compress the coil springs interposed between the tread plate and the rim of the wheel, the rods 22 will be moved radially inwardly carrying the lugs 24 past the rolls 19. The rotative movement of the rim about the axis of the wheel will be imparted to the tread plate 5 through the contact of the rolls 19 with the lugs 24. The pressure of the rolls 19 against the lugs 24 upon one side of the rolls will be greater than the pressure of the rolls against the lugs upon the opposite side of the rolls, depending upon which way the wheel is rotating. The contact of the lugs 24 which press the hardest against the rolls 19 is free to cause a rotation of the rolls 19 and spindle 18. The rotative movement of one portion of the tire section will be imparted to the other portion by means of a rolling contact.

As each section of the tire is brought beneath the wheel and subjected to the weight of the load, its advancing end, as it is brought into contact with the ground, will be crowded toward the rim of the wheel, compressing the springs at that end of the tire section. As the weight of the load is exerted upon the tire section in the plane of the central spindle 18, the springs at opposite ends will be equally compressed. As the tire section leaves the ground, an unequal compression of the opposite ends of the tire section will again occur, causing a rocking motion of the tread plate about the central spindle 18. My improved construction permits the rocking motion of the tread plate about the central spindle 18, and also the transmission of power from the rim of the wheel to the tread plate with a minimum amount of friction between the moving parts, due to the rolling contact between the rolls 19 carried by the rim and the tread plate 5. The otherwise open space between the tread plate 5 and the rim plate 9 I close, as is common in devices of this kind, by wrapping the section with a flexible covering 25, preferably of leather, and attached to the respective portions of the tire section by screws 26.

I claim:

1. The combination with a vehicle wheel of a resilient tire, comprising a series of separated sections, each of said sections comprising a rim plate and a tread plate, springs interposed between said rim plate and said tread plate, a lug projecting outwardly from the center of said rim plate and between said springs, a spindle journaled in said lug, rolls attached to the ends of said spindle beyond the ends of said lug, and two pair of lugs carried by said tread plates and arranged to contact with the opposite sides of the periphery of said rolls.

2. The combination with a vehicle wheel, of a resilient tire, consisting of a series of separated independent sections, each of said sections comprising a rim plate, a tread plate, interposed springs arranged on each side of the center of said plates and in the plane of rotation of the wheel, a lug projecting from said rim plate centrally between said springs, spaced webs extending from the ends of said lug toward each end of the rim plate, and provided at their ends with means for limiting the separation of said rim and tread plates.

FREDERIC I. JOHNSON.

Witnesses:
Ernest Aker,
Jas. C. Andrew,
Roscoe H. Lyons.

Copies of this patent may be obtained for five cents each, by addressing the "Commissioner of Patents, Washington, D. C."